3,706,574
ROASTING OF SUBDIVIDED COFFEE BEANS
James P. Mahlmann, Wayne, N.J., and Joseph F. Coogan III, Tarrytown, and Gene Alfred Mazzaferro, Richmond Hill, N.Y., assignors to General Foods Corporation, White Plains, N.Y.
No Drawing. Filed Mar. 18, 1970, Ser. No. 20,796
Int. Cl. A23f *1/02, 1/10*
U.S. Cl. 99—69                          4 Claims

ABSTRACT OF THE DISCLOSURE

Blends of green coffee beans are subdivided to permit roasting by conventional means to produce flavors substantially the same as those of blends of whole roasted beans. The subdivided green beans may be decaffeinated prior to roasting.

BACKGROUND OF THE INVENTION

The invention relates to a new and improved process for atmospherically roasting subdivided blends of green coffee beans under conditions which result in successful development of flavor equivalent to whole roasted bean flavor. More succinctly, the invention relates to ascertaining beans of varying sizes, which, when roasted and quenched by conventional means, produces flavors comparable to the whole roasted bean flavor.

Past experimentation has indicated that atmospheric roasting of subdivided green coffee beans using conventional roasting and quenching techniques were not successful in developing the whole roasted bean flavor, unless a bean size approximately one-quarter of the original size or larger was used.

The difficulties occasioned in attempting to attain whole bean flavors when using subdivided beans are apparently due to the lack of uniform roast color development and the lack of uniform cooling throughout the subdivided bean mass during the quenching step. In the context of this invention it is to be understood that fines will consist of subdivided bean particles which pass through a #16 mesh U.S. Standard Sieve (0.0469"). In general, the greater the extent of subdivision, the greater the percentage of fines, and thus the greater the incidence of the subdivided bean to exist in a form less susceptible to the type of roasting necessary to develop whole bean roast flavors. The difficulty in obtaining uniform roast color development and uniform cooling may be characterized as directly proportional to the extent of subdivided beans in particle sizes which pass through a #16 mesh U.S. Standard Sieve, in other words, the difficulty is proportional to the extent of fines. Any particles which pass through #16 mesh will constitute fines in this context.

The principal object of the invention is to provide subdivided coffee beans having particle sizes which are susceptible to uniform roasting and cooling to develop roast flavors substantially equivalent to whole roasted beans.

A further object of the invention is to provide for roasting subdivided coffee beans having particle size distributions over a fairly large range by employing subdivision techniques which minimize the extent of fines.

A yet further object of the invention is to provide subdivided coffee beans which enable more rapid decaffeination at much lower temperatures than required by whole beans, and which are also capable of more rapid roasting to produce whole roasted bean flavors.

Other objects of the invention will become apparent in the description and examples hereinafter appearing.

SUMMARY OF THE INVENTION

It has now been discovered that subdivision of blends of green coffee beans to particle sizes less than one quarter of the original dimension permits atmospheric roasting and conventional quenching, to develop whole bean flavors if the quantity of fines in the subdivided bean mass are not excessive (less than 10%).

Preferably, this is accomplished by slicing the green bean blend over ranges of slice distribution sizes which are too large to pass through a #16 mesh U.S. Standard Sieve. The sliced bean particles are atmospherically roasted in a solid cylinder roaster and quenched by conventional techniques, i.e. immediately immersed in cool air, water sprays or air and water sprays.

The subdivision techniques of this invention substantially eliminates the charring tendencies of subdivided green coffee beans prepared for subsequent roasting, without materially altering the roasting and quenching conditions and permits the substantial uniform roasting and cooling essential to produce roasted whole bean flavors.

It has been found that coffee beans which have been subdivided, either coarsely or fine, may be more rapidly decaffeinated using milder temperatures than those required in the case of whole beans. In addition, these ground coffees are capable of swifter atmospheric roasting and faster cooling or quenching than whole coffee beans; however, the advantages of all of these more efficient processing steps could not be fully appreciated due to the difficulty in attempting to eliminate the charred or tarry taste, and obtain whole bean roast flavors when utilizing ground beans.

DETAILED DESCRIPTION OF THE INVENTION

Generally, a subdivided bean mass containing a narrow particle size distribution range, lends itself to more uniform roasting and cooling than a subdivided bean mass having a broad range of particle size distributions. Accordingly, the former bean mass would have more potential upon roasting and quenching to produce whole roasted bean-like flavors than the latter.

Nevertheless, it has unexpectedly been discovered that the disparity in obtaining whole roasted bean flavors employing subdivided beans is more pronounced in similarly ground distribution ranges containing varying amounts of fines (ranging from high or above 10% to low or below 10%) than between narrow and broad particle size distribution ranges which contain little or no fines. Moreover, subdivision of the beans to similar particle sizes using the technique of slicing as opposed to grinding tends to produce a lesser degree of fines; therefore, the former subdivision technique produces a subdivided bean mass having a greater potential upon roasting and quenching to provide whole roasted bean like flavors than the latter technique. The sliced beans will produce even less fines if prewetted to a moisture content not in excess of about 50% prior to slicing.

When blends of coffee beans are subdivided wholly into fines, the resultant roast flavors produced are so charred and tarry in taste and smell that no realistic expectation of marketing such a product for human consumption and taste may be entertained. On the other hand, practical experience compels recognition that most commercial subdivision techniques will produce some fines. However, if the fines are excessive in quantity, an unacceptable roast flavor, hardly a facsimile of a whole bean roast flavor will ensue. It has been found that a tolerable level of fines will be that which does not produce a marked or detectable variance in flavor between roasted subdivided coffee flavors and whole bean roast flavors. When the fines are in excess of 10%, an unacceptable flavor results when attempts are made to emulate whole bean flavors. The best roast flavor most akin to whole bean roast flavors are obtained when the fines are present in less than 5% by weight of subdivided bean mass. Thus, it will be understood by the skilled worker in the art that an unexpectant whole bean roast-like flavor may be obtained when roasting subdivided coffee beans if the extent of coffee fines are maintained under 10% by weight of the subdivided bean mass.

The following examples will more specifically set forth the preferred but non-limiting embodiments of the invention.

Example I

A blend of 12% Milds, 30% Santos and 58% Robusta green coffee beans is coarse ground on a Eureka grinder at a 3/32" setting to give a grind distribution having an average particle size of 0.094", however 12% of the grind passed through the #16 sieve as fines. The blend is then atmospherically roasted in 500 pound lots in a solid cylinder roaster at temperatures ranging from 250–650° F. for 9½ to 15 minutes or for a length of time to obtain the desired roast color. Upon removing the hot roasted blend for conventional quenching in cold air to produce ambient temperatures, the uppermost air exposed surface charred immediately whereas the innermost portion of the bed did not. A comparison of these ground roasted beans with an identical blend of whole roasted beans disclosed that an inferior flavor and taste disadvantage characterized the ground bean.

Example II

A blend of 12% Milds, 30% Santos and 57% Robusta green coffee beans is sliced on a Urschel slicer at a 3/32" setting to give a grind distribution having an average particle size of 0.102", however, only 3.5% of the slice passed through the #16 sieve as fines. The blend is then atmospherically roasted in 500 pound lots in a solid cylinder roaster as in Example I. Upon removing the hot roasted blend for conventional quenching in cold air to produce ambient temperatures, no perceptible charring of the uppermost air exposed surface occurred. A comparison of these sliced roasted beans with an identical blend of whole roasted beans disclosed that a flavor substantially the same as the whole roasted bean flavor was produced.

Example III (same blends as in Example I and II)

| Subdivision means | Setting (inch) | Average percent thru §16 sieve | Average particle size (inch) | Comparison to whole roast flavor |
|---|---|---|---|---|
| Eureka grinder | 1/32 | 15 | 0.079 | Unacceptable. |
| Do | 1/16 | 14 | 0.085 | Do. |
| Do | 3/32 | 12 | 0.097 | Do. |
| Do | 1/8 | 6 | 0.110 | Acceptable. |
| Urschel slicer | 0.055 | 8 | 0.083 | Do. |
| Do | 0.070 | 8 | 0.090 | Do. |
| Do | 0.090 | 6 | 0.102 | Do. |
| Do | 0.095 | 5 | 0.104 | Do. |
| Do | 0.100 | 4 | 0.118 | Do. |

It is readily apparent that subdivision by grinding is an effective means for producing blends of coffee particles, which upon roasting, provide whole bean roasted flavors; however, when the grind setting is smaller than 1/8" excessive fine production will prevent development of whole bean roast flavors upon roasting. Also apparent is the fact that subdivision by slicing over a broad setting range will produce partciles capable of developing whole roast bean flavors upon conventional roasting and quenching.

Example IV

Same as Example II, except that prior to slicing, the beans were prewetted to a moisture content not in excess of 50% by weight of the bean.

Example V

Same as Example II, except that, following slicing, the beans are water decaffeinated at temperatures between 100° F. to 120° F. for 6 to 8 hours, according to the process of U.S. Pat. #2,309,092.

Example VI

Same as Example II, except that, following slicing, the beans are solvent decaffeinated at temperatures between 80° F. to 120° F. for about 6 hours, according to the process of U.S. Patents Numbers 1,977,416 and 2,381,965, using, in addition to the solvents disclosed therein, 1,2-dichlorethylene.

While the preferred embodiment will constitute a prewetted sliced bean having less than 5% fines prior to roast, it is to be understood by the skilled practitioner that when the subdivision means produce fines in excess of 10%, whole roasted bean flavors will not acceptably develop when conventionally roasting and quenching subdivided blends of green coffee beans according to the inventive concept. However, any subdivision means, including, but not limited to slicing and grinding, will suffice if the fine levels are kept below excessive proportions.

What is claimed is:

1. A method for producing an improved decaffeinated roasted and ground coffee comprising the steps of:
    (a) subdividing whole green coffee beans to particle sizes less than one quarter of their original size while limiting the particles which will pass through a #16 mesh U.S. Standard Sieve screen to less than 10% by weight.
    (b) decaffeinating the subdivided beans,
    (c) roasting the decaffeinated coffee particles in a solid cylinder roaster, and
    (d) quenching the roasted particles to terminate the roast.

2. The process of claim 1 wherein the green beans are prewetted to a moisture content of up to 50% prior to subdivision.

3. The process of claim 2 wherein the whole beans are subdivided by slicing.

4. The process of claim 3 wherein the particles which will pass through a #16 U.S. Standard Sieve screen are less than 5% by weight.

References Cited

UNITED STATES PATENTS

| | | | |
|---|---|---|---|
| 2,212,120 | 8/1940 | Kneale et al. | 99—68 |
| 1,977,416 | 10/1934 | Wilder | 99—70 |
| 2,309,139 | 1/1943 | Rector | 99—70 |
| 2,133,559 | 10/1938 | Mushaben | 99—68 |
| 2,097,591 | 11/1937 | Finley | 99—68 |

FRANK W. LUTTER, Primary Examiner

W. L. MENTLIK, Assistant Examiner

U.S. Cl. X.R.

99—68